(12) United States Patent
Sato et al.

(10) Patent No.: US 7,385,127 B2
(45) Date of Patent: Jun. 10, 2008

(54) ANGLE ADJUSTOR

(75) Inventors: Naoki Sato, Seto (JP); Hideyuki Miyajima, Seto (JP)

(73) Assignee: Hoshino Gakki Mfg. Co., Ltd. (JP)

( * ) Notice: Subject to any disclaimer, the term of this patent is extended or adjusted under 35 U.S.C. 154(b) by 288 days.

(21) Appl. No.: 11/175,573

(22) Filed: Jul. 6, 2005

(65) Prior Publication Data

US 2006/0096444 A1    May 11, 2006

(30) Foreign Application Priority Data

Nov. 8, 2004   (JP)   ............................. 2004-324036
Mar. 30, 2005  (JP)   ............................. 2005-099947

(51) Int. Cl.
   *G10D 13/02*   (2006.01)
(52) U.S. Cl. .................................. 84/422.3; 248/125.7
(58) Field of Classification Search ............... 84/422.3, 84/421, 453; 403/84, 91, 111, 145; 248/125.7, 248/122.1, 185.1, 178.1, 414, 441.1
   See application file for complete search history.

(56) References Cited

U.S. PATENT DOCUMENTS 5,146,808 A  *  9/1992  Hoshino ....................... 74/531
5,154,382 A  * 10/1992  Hoshino .................. 248/185.1
6,268,556 B1 *  7/2001  Liao ............................ 84/421

* cited by examiner

*Primary Examiner*—Lincoln Donovan
*Assistant Examiner*—Jianchun Qin
(74) *Attorney, Agent, or Firm*—Ostrolenk, Faber, Gerb & Soffen, LLP

(57) ABSTRACT

An angle adjustor includes a fixed member, a movable member, a plurality of friction plates arranged between the fixed and movable members, and a bolt connecting the fixed and movable members. The fixed member and the movable member each have a notch for receiving a pressing member that presses the friction plates against the surface of the notch. Each pressing member is fixed to the fixed member or movable member in a direction substantially parallel to the axis of the bolt. The friction plates are fixed between the notch and the pressing member.

9 Claims, 7 Drawing Sheets

ANGLE ADJUSTOR

BACKGROUND OF THE INVENTION

The present invention relates to an angle adjustor, and more particularly, to an angle adjustor for a musical instrument.

It is desirable that the angular position of a musical instrument, such as a cymbal and a snare drum supported by a floor stand, a cymbal supported on a bass drum, or a tom-tom, be adjusted in accordance with the performer's preferences, physical features, etc. Once the angular position of a musical instrument is adjusted, it is desired that the musical instrument be stably supported during performance at the adjusted angle. U.S. Pat. No. 5,146,808 describes an angle adjustor 61, as shown in FIG. 9. The angle adjustor 61 includes a movable member 63, a fixed member 62, and a plurality of friction plates 64a and 64b. The movable member 63 is connected to a musical instrument, such as a cymbal. The fixed member 62 is connected to a main body of a stand. The plurality of friction plates 64 are arranged between the movable member 63 and the fixed member 62. In detail, two friction plates 64a are attached to the fixed member 62, and three friction plates 64b are attached to the movable member 63. The friction plates 64a and the friction plates 64b are alternately arranged. Each of the friction plates 64a and 64b has three teeth 65 on its outer circumference. The fixed member 62 and the movable member 63 have four teeth. The three teeth 65 of each of the friction plates 64a and 64b are engaged in grooves formed between the four teeth 66 of the corresponding one of the fixed member 62 and the movable member 63. The fixed member 62 and the movable member 63 are fixed to each other by a bolt 67 and a nut 68.

In the above angle adjustor 61, the nut 68 is loosened to enable the movable member 63 to rotate relative to the fixed member 62, and the movable member 63 is arranged at a desired angle relative to the fixed member 62. Then, the nut 68 is tightened so that the movable member 63 comes into contact with the fixed member 62 via the plurality of friction plates 64a and 64b. As a result, the musical instrument, which is connected to the movable member 63, is supported at the desired angular position.

However, in the adjustor 61, the positioning of the friction plates 64a and 64b relative to the movable member 63 and the fixed member 62 is performed by the engagement between the teeth 65 and the teeth 66. Thus, there may be a slight backlash produced at the position of engagement between the friction plates 64a and the movable member 63 and the position of engagement between the friction plates 64a and the fixed member 62. At such backlash positions, friction force produced by the friction plates 64a and 64b is not applied to the movable member 63 and the fixed member 62 no matter how tight the friction plates 64a and 64b are fastened to each another. This may slightly move the movable member 63, which is fixed to the fixed member 62. As a result, the musical instrument is not stably supported even after its angle has been adjusted.

U.S. Pat. No. 5,154,382 describes an angle adjustor 81 shown in FIG. 10 that solves this problem. The angle adjustor 81 includes a fixed member 82, a movable member 83, and a plurality of friction plates 84a and 84b, which are arranged between the fixed member 82 and the movable member 83. The plurality of friction plates 84a and 84b are tightened to one another and are fixed to the fixed member 82 by a bolt 87 and a nut 88. Additionally, tabs 85 extending from the friction plates 84a and 84b are received in slots 86 of the fixed member 82 and the movable member 83. The tabs 85 are pressed against side walls of the slots 86 by screws 89 to fix the friction plates 84a and 84b in the slots 86. The friction plates 84a and 84b are securely fixed to the corresponding one of the movable member 83 and the fixed member 82. This stably supports the musical instrument.

However, in the above angle adjustor 81, the screws 89 are oriented in the direction in which the movable member 83 rotates. When playing the musical instrument, a force that causes the movable member 83 to rotate may be applied to the screws 89 via the tabs 85 of the friction plates 84. This may loosen the screws 89. In such a case, the screws 89 cannot hold the tabs 85 in a fixed state. Thus, the movable member 83, which is fixed to the fixed member 82, may slightly move. As a result, the musical instrument, which has been adjusted to a desired angular position, may not be stably supported.

Further, in the adjustor 81, the movable member 83 is sandwiched by the fixed member 82. Thus, the fixed member 82 and the movable member 83 have different shapes. This complicates the manufacturing processes for the adjustor 81 and causes assembly of the adjustor 81 to be difficult.

SUMMARY OF THE INVENTION

It is an object of the present invention to provide an angle adjustor for a musical instrument that enables stable angle adjustment. It is another object of the present invention to provide an angle adjustor for a musical instrument with a simple structure. It is still another object of the present invention to provide an angle adjustor for a musical instrument that is easy to manufacture.

One aspect of the present invention is an angle adjustor for attachment to a musical instrument support for supporting a musical instrument and adjusting angular position of the musical instrument. The adjustor includes a fixed member connectable to the support. A movable member is connectable to the musical instrument and arrangable facing the fixed member in a manner rotatable relative to the fixed member. The movable member is rotatable to enable adjustment of the angular position of the musical instrument. A rotation shaft rotatably connects the movable member to the fixed member. At least two friction plates, through which the rotation shaft is inserted, are arranged between the fixed member and the movable member. Two pressing members restrict rotation of the friction plates relative to the movable member and the fixed member with force acting in a direction parallel to an axis of the rotation shaft. The pressing members press the friction plates against the fixed member and the movable member using force applied in a rotation direction of the movable member to prohibit movement the friction plates. A fastening member fastens the movable member to the fixed member to press the friction plates against one another between the movable member and the fixed member and adjust force that fastens the movable member to the fixed member.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

Figure 1:
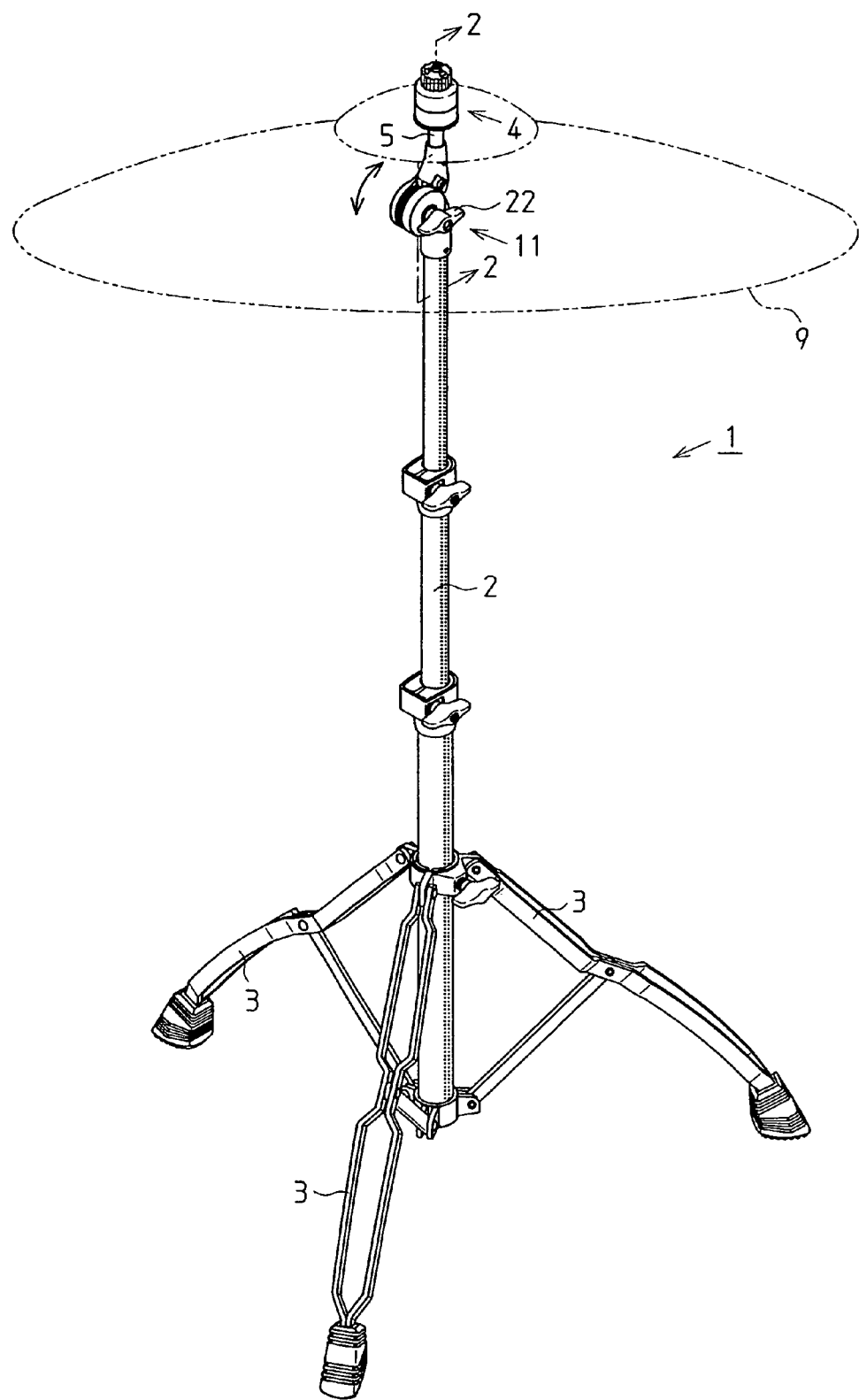
FIG. 1 is a perspective view showing a musical instrument stand.

As shown in FIG. 1, a musical instrument stand 1 includes a pipe 2, which is supported by three legs 3 and extends upward, an angle adjustor 11 (hereafter, simply referred to as an "adjustor 11"), which is connected to the upper end of the pipe 2, and a musical instrument support 4, which is attached on the top of the adjustor 11. In the present embodiment, a cymbal 9 is held by the musical instrument support 4.

Figure 2:
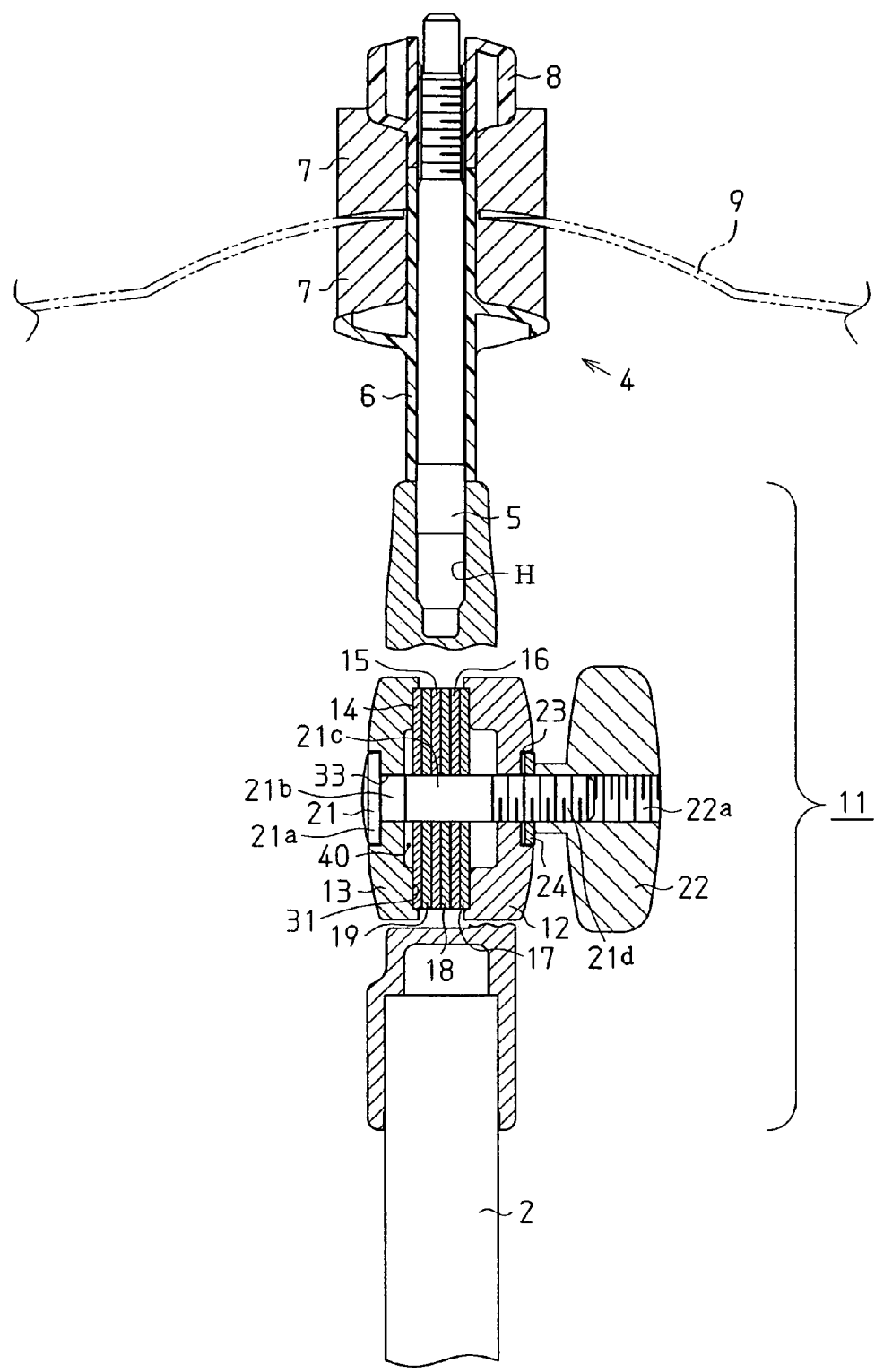
FIG. 2 is a partial cross-sectional diagram of an angle adjustor and a musical instrument support taken along line 2-2 of FIG. 1.

As shown in FIG. 2, the angle adjustor 11 includes a fixed member 12, a movable member 13, and a plurality of (six in the present embodiment) friction plates 14, 15, 16, 17, 18, and 19. The friction plates 14, 15, 16, 17, 18, and 19 are arranged between the fixed member 12 and the movable member 13. The angle adjustor 11 further includes a bolt 21, which extends into the movable member 13 from the outer side. The bolt 21 extends through the movable member 13, the friction plates 14 to 19, and the fixed member 12.

Figure 3:
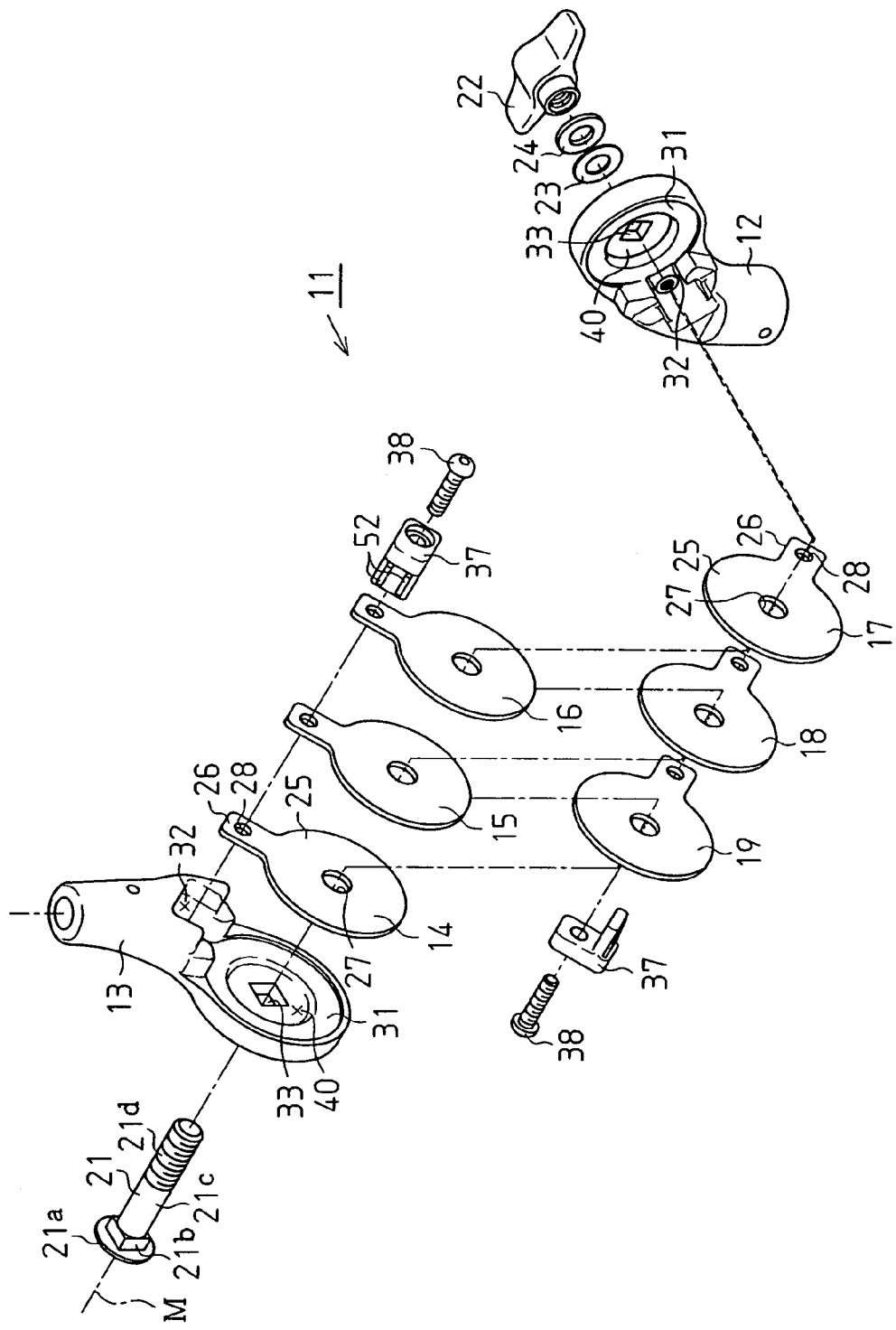
FIG. 3 is an exploded perspective view showing the angle adjustor.

As shown in FIG. 3, the bolt 21 is a carriage bolt having a polygonal neck. In detail, the bolt 21 includes a head 21a, which is disk-shaped, a neck 21b, which is polygonal (in the present embodiment, square) and extends continuously from the head 21a, a rod 21c, which is cylindrical and is formed as being continuous from the neck 21b, and a threaded male portion 21d, which is formed continuously from the rod 21c on the distal end of the bolt 21. A T-shaped nut 22 has a threaded female portion 22a projecting outward from the fixed member 12. The threaded female portion 22a is mated with the threaded male portion 21d of the bolt 21 with a Belleville spring 23 and a washer 24 arranged therebetween (refer to FIG. 2). In this way, the movable member 13 and the fixed member 12 are securely fixed to each other.

Each of the friction plates 14 to 19, which is made from a thin metal material, is formed by a disk 25 and a tab 26. The disk 25 is circular. The tab 26 is rectangular and extends from the outer circumference of the disk 25. The disk 25 has a center hole 27 through which the rod 21c of the bolt 21 is inserted. The tab 26 has a hole 28. A screw 38, which functions as a fastener, is inserted through the holes 28 of the friction plates 14 to 16 to fasten the three friction plates 14 to 16 to the movable member 13. A screw 38, which functions as a fastener, is inserted through the holes 28 of the friction plates 17 to 19 to fasten the three friction plates 17 to 19 to the fixed member 12.

Figure 4:
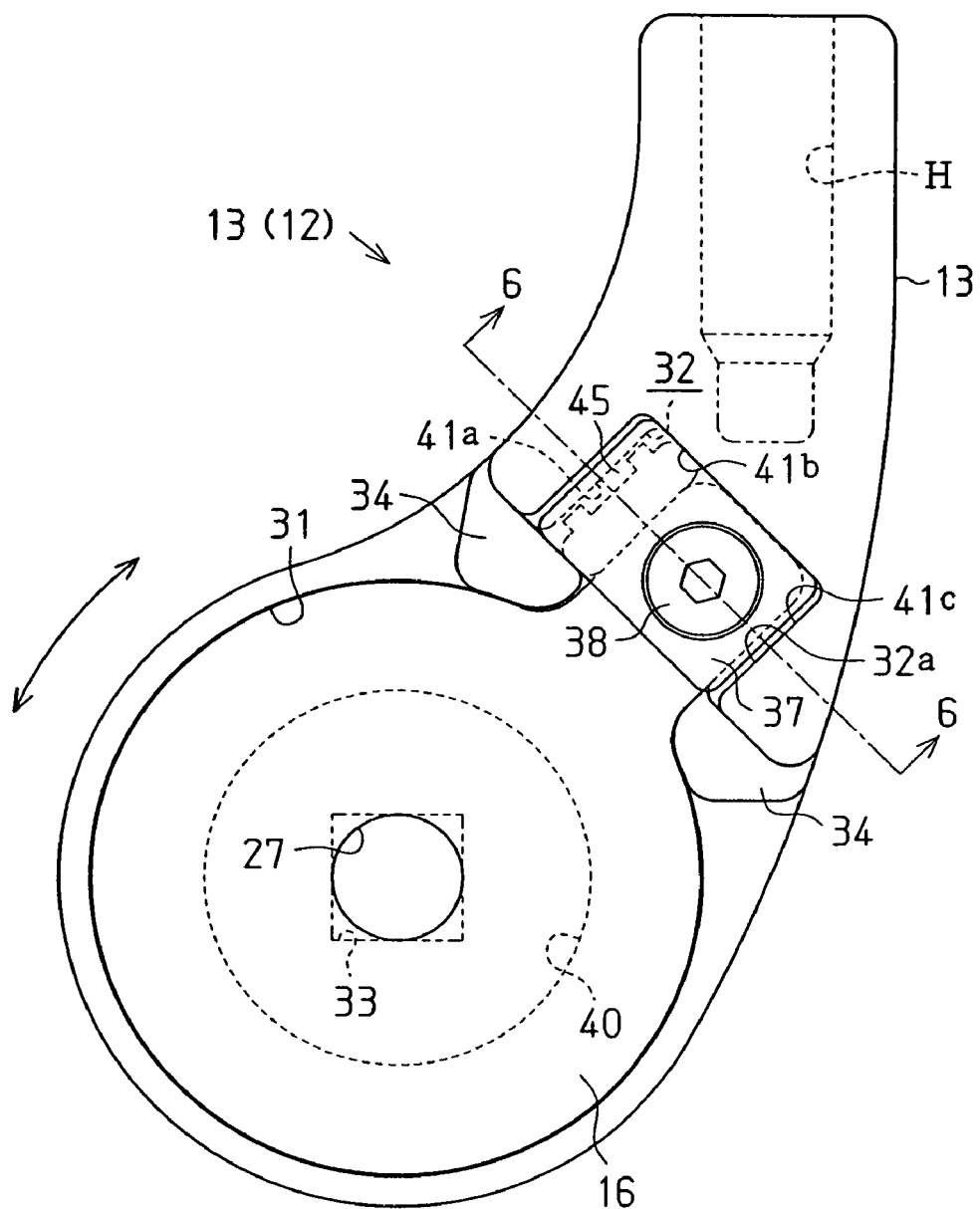
FIG. 4 is a front view showing a movable member.

As shown in FIGS. 3 and 4, the movable member 13 has a circular socket 31 and a notch 32. The notch 32 extends from the outer circumference of the socket 31. The socket 31 is shaped in correspondence with the disk 25 of the friction plates 14 to 16. The notch 32 is shaped in correspondence with the tabs 26 of the friction plates 14 to 16. When the three friction plates 14 to 16 are attached to the movable member 13, the tab 26 of the friction plate 14, which is closest to the movable member 13, is received in the notch 32, and the disk 25 of the friction plate 14 is received in the socket 31.

A small-diameter recess 40 (refer to FIGS. 2 to 4), which is deeper than the socket 31, is formed in a central portion of the socket 31. A square hole 33, into which the neck 21b of the bolt 21 is fitted, extends through the center of the small-diameter recess 40.

To connect the notch 32 to the socket 31, the movable member 13 has two holding portions 34, which are two thick portions facing each other and spaced apart by a distance corresponding to the width of the tabs 26. The holding portions 34 sandwich a basal portion of the tab 26 of each of the friction plates 14 to 16. This roughly prevents rotation of the friction plates 14 to 16 in the movable member 13.

Referring to FIG. 3, the tabs 26 of the three friction plates 14 to 16 are arranged in the notch 32. The three tabs 26 are stacked and attached to the movable member 13 by a pressing member 37 and the screw 38.

The fixed member 12 has a structure similar to that of the fixed member 12. Thus, the fixed member 12 also has a socket 31, a notch 32, a hole 33, and a small-diameter recess 40. The three friction plates 17 to 19 are attached to the fixed member 12 by a pressing member 37 and the screw 38.

To assemble the movable member 13 and the fixed member 12 together, the movable member 13 and the fixed member 12 are arranged so that their sockets 31 face each other. The friction plates 14 to 16 attached to the movable member 13 and the friction plates 17 to 19 attached to the fixed member 12 are alternately arranged.

The nut 22, which is fastened to the bolt 21, is turned to adjust the clamping force applied by the movable member 13 and the fixed member 12 to the friction plates 14 to 19. When the nut 22 is turned, the neck 21b of the bolt 21 is received in the hole 33, which is shaped in correspondence with the neck 21b, to restrict rotation of the bolt 21 relative to the movable member 13. This structure enables the nut 22 to be loosened or tightened by a player with a single hand. When the nut 22 is loosened, the movable member 13 becomes rotatable relative to the fixed member 12 about the bolt 21. When the nut 22 is tightened, the movable member 13 becomes fixed relative to the fixed member 12.

The pressing members 37 and the notches 32 for fixing the friction plates 14 to 19 to the fixed member 12 and the movable member 13 will now be described in detail. In the same manner as above, only the pressing member 37 and the notch 32 for the movable member 13 will be described.

Figure 5:
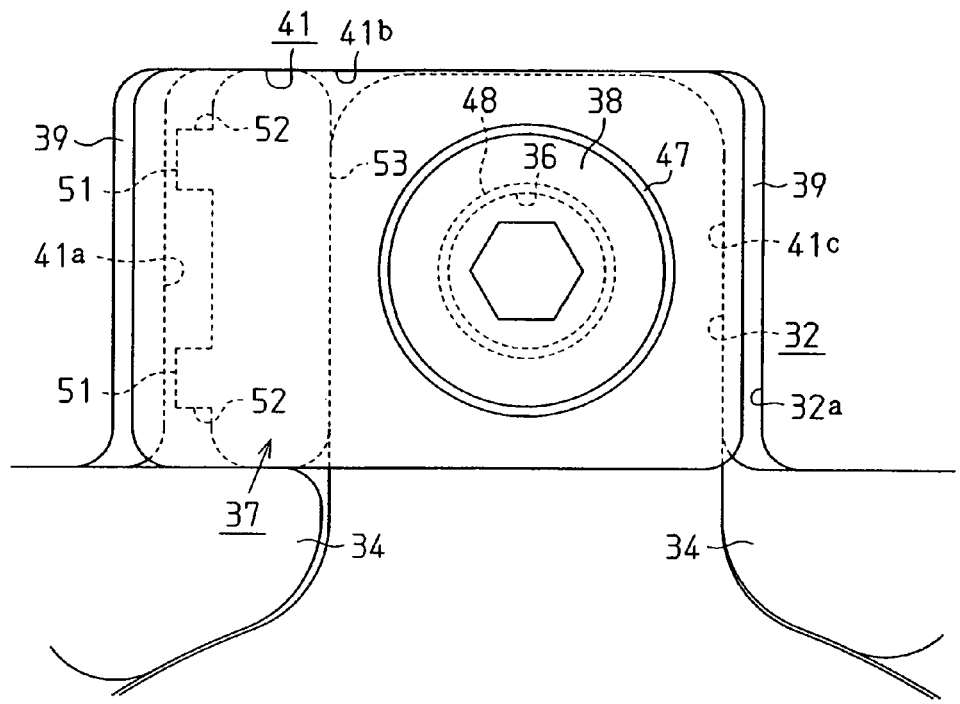
FIG. 5 is a partially enlarged plan view showing an internal structure of a notch.
Figure 6:
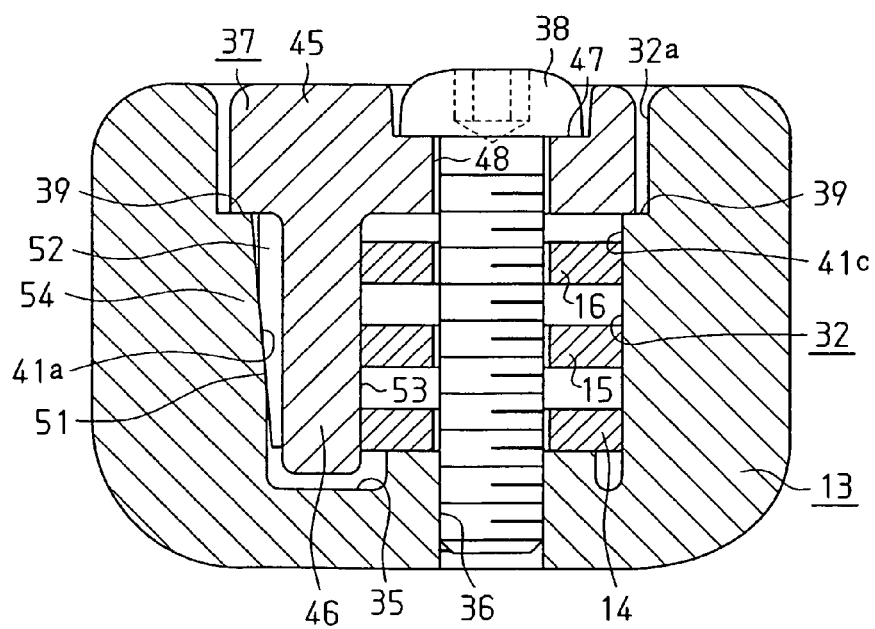
FIG. 6 is an enlarged cross-sectional view showing an internal structure of the notch taken along line 6-6 of FIG. 4.

As shown in FIGS. 5 and 6, the notch 32 is defined by walls including two opposing stepped portions 39. The stepped portions 39 are located between a top end opening 32a and a bottom portion 35 in the notch 32. The notch 32 is formed so that the distance between opposing portions of a wall surface 41 gradually decreases from the stepped portions 39 toward the bottom portion 35. In detail, the notch 32 has a first side wall 41a and a second side wall 41c that face each other. The second side wall 41c extends in a direction parallel to the insertion direction of the pressing member 37 (direction parallel to the axis M of the bolt 21 (refer to FIG. 3)). The first side wall 41a is formed by a surface that is inclined so that the distance between the first side wall 41a and the second side wall 41c decreases from the stepped portions 39 toward the bottom portion 35. A third side wall 41b, which connects the first side wall 41a and the second side wall 41c, is formed to extend in the insertion direction of the pressing member 37, so that the third side wall 41b extends at right angles to the first side wall 41a and the second side wall 41c. The first side wall 41a, the second side wall 41c, and the third side wall 41b form the wall surface 41, which defines the notch 32. A hole 36, to which the screw 38 is fastened, is formed in the bottom portion 35. The hole 36 is located at a position slightly closer to the second side wall 41c than the middle of the bottom portion 35. The screw 38, which is inserted through the holes 28 of the tabs 26 of the friction plates 14 to 16, is fastened to the hole 36 to fix the friction plates 14 to 16 to the movable member 13.

The pressing member 37, which is received in the notch 32, covers the top end opening 32a of the notch 32. The pressing member 37 includes a plate-like head 45, which comes in contact with the two stepped portions 39. The pressing member 37 further includes a functional piece 46 extending from the inner side of the head 45 into the notch 32 along the inclined surface of the first side wall 41a. The functional piece 46 extends in a direction substantially perpendicular to the head 45. The pressing member 37, which includes the head 45 and the functional piece 46, is substantially L-shaped.

A hole 48, through which the screw 38 is inserted, is formed in the head 45. The hole 48 is located slightly closer to the second side wall 41c than the middle of the head 45. Further, a recessed seat 47, which comes into contact with the head of the screw 38, is formed around the hole 48 of the head 45.

The functional piece 46 has first end surfaces 51 and a second end surface 53. The first end surfaces 51 are defined by two ribs 52 and inclined in correspondence with the inclined surface of the first side wall 41a. The second end surface 53 is defined on the side of the functional piece 46 opposite to the first end surfaces 51. The second end surface 53 comes into contact with the tabs 26 of the friction plates 14 to 16.

The head 45 is shaped substantially in correspondence with the notch 32 (refer to FIG. 5). However, the head 45 is held in a state partially spaced from the wall surface 41. When the pressing member 37 is inserted in the notch 32 so that the functional piece 46 is positioned substantially parallel to the axis M of the bolt 21 (refer to FIG. 3), the second end surface 53 of the functional piece 46 comes into contact with one side (left side as viewed in FIG. 6) of the tabs 26 of the three friction plates 14 to 16. The other side (right side as viewed in FIG. 6) of the tabs 26 comes into contact with the second side wall 41c in the notch 32. In this manner, the second end surface 53 of the pressing member 37 and the second side wall 41c of the notch 32 hold the friction plates 14 to 16 and restrict movement of the friction plates 14 to 16.

Before the screw 38 is inserted in the hole 48, a slight gap is formed between the lower surface of the head 45 and the stepped portions 39. In this state, the screw 38 is inserted into the hole 48, and the pressing member 37 is fastened to the movable member 13 to fix the pressing member 37 in the notch 32. As a result, the pressing member 37 rigidly presses the friction plates 14 to 16 against the socket 31. Accordingly, the friction plates 14 to 16 are securely attached to the movable member 13.

The fastening of the screw 38 moves the pressing member 37 downward. Contact of the head 45 with the stepped portions 39 restricts downward movement of the pressing member 37, which in turn, prevents the pressing member 37 from being fastened to the movable member 13 more than necessary. This keeps the ribs 52 on the functional piece 46 of the pressing member 37 free from damage. The stepped portions 39 also prevent the head 45 from falling into the socket 31. The stepped portions 39 maintain the interval between the tabs 26 of the friction plates 14 to 16 and 17 to 19 and enable alternate stacking of the friction plates 14 to 16 and 17 to 19 when the movable member 13 and the fixed member 12 are assembled together. The insertion direction of the screw 38 is the same as the insertion direction of the pressing member 37. That is, the insertion direction of the screw 38 is substantially parallel to the axis M of the bolt 21.

The musical instrument support 4 will now be described. As shown in FIGS. 2 and 4, the movable member 13 has a holding hole H. As shown in FIG. 2, the musical instrument support 4 includes a shaft 5 inserted in the holding hole H. Two felt cushions 7 are arranged on a resin sleeve 6, which is attached to the shaft 5. The cymbal 9 is held between the two cushions 7. In this state, a nut 8 is fastened to the shaft 5. As a result, the musical instrument stand 1 supports the cymbal 9 with the movable member 13 and the fixed member 12.

The first embodiment has the advantages described below.

(1) The nut 22 of the angle adjustor 11 is loosened to enable the movable member 13 to rotate. This enables the cymbal 9, which is connected to the movable member 13, to be adjusted to a desired angular position. In this state, the friction plates 14 to 19 are rigidly attached to the fixed member 12 and the movable member 13 by the associated pressing members 37. More specifically, the pressing member 37 inserted in each notch 32 moves toward the bottom portion 35 in proportion to the amount the screw 38 is mated with the hole 36. The inclined end surfaces 51 of the pressing member 37 produce an outward force applied to the first side wall 41a, which functions as the wall of the notch 32. This further produces an inward force applied to the ribs 52. As a result, the second end surface 53 of the functional piece 46 rigidly presses the friction plates 14 to 19.

Thus, the tabs 26 of the friction plates 14 to 19 are fixed in the notch 32 without any displacement so that friction force is generated between the friction plates 14 to 19, which are attached to the movable member 13 and the fixed member 12. Thus, if the fastened amount of the nut 22 is appropriate, the friction force produced by the friction plates 14 to 19 hold the movable member 13 and the fixed member 12. In this state, the tabs 26 of the friction plates 14 to 19 are stably held in the notch 32. As a result, the adjustor 11 stably supports the cymbal 9 at the desired angular position.

In particular, when a percussion instrument, such as the cymbal 9, is connected to the adjustor 11, the adjustor 11 is constantly subjected to a load generated by vibrations when playing the instrument. If the friction plates 14 to 19 were to be attached to one another in an unstable manner, such vibrations would displace the friction plates 14 to 19. The present invention solves such a problem.

(2) The screw 38, which fixes the friction plates 14 to 16 or 17 to 19, is oriented in a direction substantially parallel to the axis M of the bolt 21. In other words, the screw 38 is oriented in a direction differing from the rotation direction of the movable member 13. Accordingly, the screw 38 does not directly receive force produced by the rotation of the movable member 13. This prevents the screw 38 from being loosened or damaged.

(3) The pressing members 37, which are inserted into the notches 32, are also oriented in a direction substantially parallel to the axis M of the bolt 21. This prevents the pressing member 37 from being displaced in the notch 32 by force generated by the rotation of the movable member 13.

(4) A wedge effect is produced between the inclined end surface 51, which is defined on each rib 52 of the functional piece 46 of the pressing member 37, and the first side wall 41a of the notch 32. The wedge effect presses the tabs 26 of the friction plates 14 to 16 or 17 to 19 to be pressed against the fixed member 12 and the movable member 13. This rigidly secures the friction plates 14 to 19. Thus, even when supporting a large and heavy musical instrument, the friction plates are firmly fastened and do not become loose.

(5) The opening width of each notch 32 decreases gradually toward the bottom portion 35. This facilitates the insertion of the pressing member 37 into the notch 32.

(6) The small-diameter recess 40, which is formed in the central portion of the socket 31, functions to produce a large friction force with the friction plates 14 to 19. This is because of the next reason. When assuming that the small-diameter recess 40 is not formed in the socket 31, a manufacturing error or other reasons may form a projection in the central portion of the socket 31. This would result in the movable member 13 failing to stably contact the peripheral portion of the disk 25 of the friction plate 14 that produces the large friction force. The movable member 13 would contact only the central portion of the disk 25. When the movable member 13 contacts only the central portion of the disk 25, a pressing force generated by the bolt 21 and the nut 22 is not applied to the peripheral portion of the disk 25 but is applied only to the central portion of the disk 25. In this case, the friction plates 14 to 19 do not produce a sufficiently large friction force with the peripheral portions of the disks 25. As a result, even when supporting a light musical instrument, the movable member 13 may not be held at a fixed position. Therefore, the adjustor 11 has the small-diameter recess 40 so that the flat bottom surface of the socket 31 presses the peripheral portion of the disk 25 of the friction plate 14. As a result, the friction plates 14 to 19 maximize friction force.

(7) The fixed member 12 and the movable member 13 have similar structures. Thus, the adjustor 11 is easy to manufacture.

(8) Each screw 38 is inserted through the holes 28 formed in the tab 26 of the friction plates 14 to 16 or 17 to 19. Further, the distal end of the screw 38 is fastened to the hole 36 in the bottom portion 35. This structure prevents the friction plates 14 to 16 from being separated from the movable member 13 before the fixed member 12 and the movable member 13 are assembled together.

Second Embodiment

An angle adjustor 111 according to a second embodiment of the present invention will now be described, with reference to FIG. 7, focusing on parts differing from the first embodiment. The angle adjustor 111 of the second embodiment has the same structure as the first embodiment except in the fastening position of each screw 38, which functions as the fastener of the angle adjustor 11. The components of the angle adjustor 111 that are identical or equivalent to the components of the angle adjustor 11 are given the same reference numerals as those components and will not be described in detail.

Figure 7:
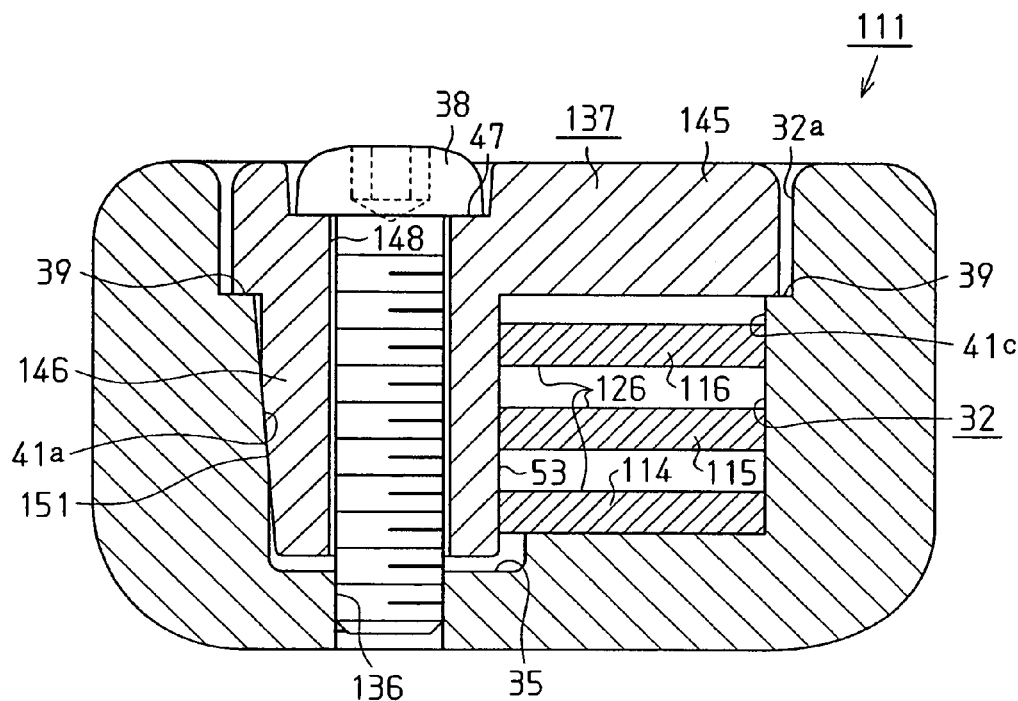
FIG. 7 is an enlarged cross-section view showing an internal structure of a notch in a second embodiment of the present invention.

As shown in FIG. 7, a pressing member 137 includes a plate-like head 145 and a functional piece 146 as in the first embodiment.

The pressing member 137 has a hole 148, through which the screw 38 is inserted. The hole 148 is located at a position closer to the first side wall 41a than the middle of the head 145. The hole 148 extends through the head 145 and the functional piece 146.

The functional piece 146 has an inclined first end surface 151 and a second end surface 53. The inclined first end surface 151 is shaped in correspondence with the inclined surface of the first side wall 41a. The second end surface 53 comes into contact with tabs 126 of friction plates 114 to 116. The inclined first end surface 151 in the present embodiment does not have parts corresponding to the ribs 52 of the first embodiment and is a flat surface. In the present embodiment, each of the friction plates 114 to 119 includes a disk 25 and a tab 126 projecting from the outer circumference of the disk 25. The tab 126 of each of the friction plates 114 to 119 does not have a hole.

When the pressing member 137 is inserted into the notch 32, the second end surface 53 of the functional piece 146 comes into contact with one side (left side as viewed in FIG. 6) of the tabs 126 of the three friction plates 114 to 116. Further, the other side (right side as viewed in FIG. 6) of the tabs 126 of the friction plates 114 to 116 comes into contact with the second side wall 41c in the notch 32. Thus, the friction plates 114 to 116 are held, without being displaced, by the second end surface 53 of the pressing member 137 and the second side wall 41c of the notch 32.

In the angle adjustor 111, the screw 38 applies to the functional piece 146 a force in a direction substantially parallel to the axis M of the bolt 21.

The angle adjustor 111 of the second embodiment has the advantage described below in addition to advantages (1) to (5) of the first embodiment.

(9) When fastening the screw 38, a force in a direction substantially parallel to the axis M of the bolt 21 is applied to the functional piece 146. Thus, a force that tilts the pressing member 137 is not generated. The friction plates 114 to 116 are effectively held by the second end surface 53 of the pressing member 137 and the second side wall 41c of the notch 32.

Third Embodiment

Figure 8:
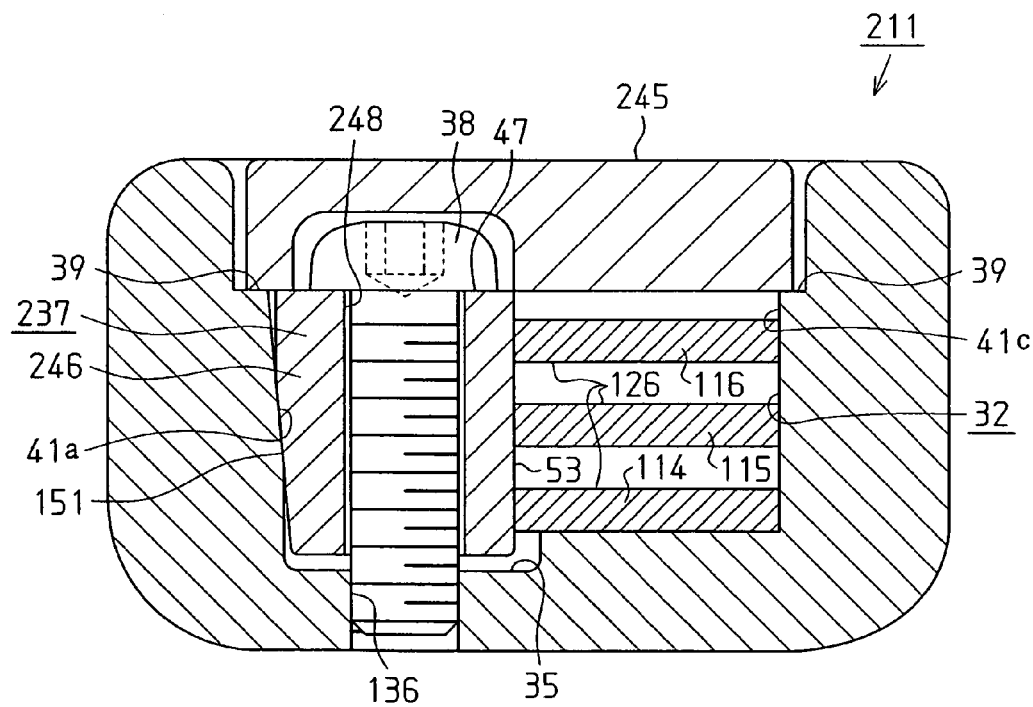
FIG. 8 is an enlarged cross section showing an internal structure of a notch in a third embodiment of the present invention.
Figure 9:
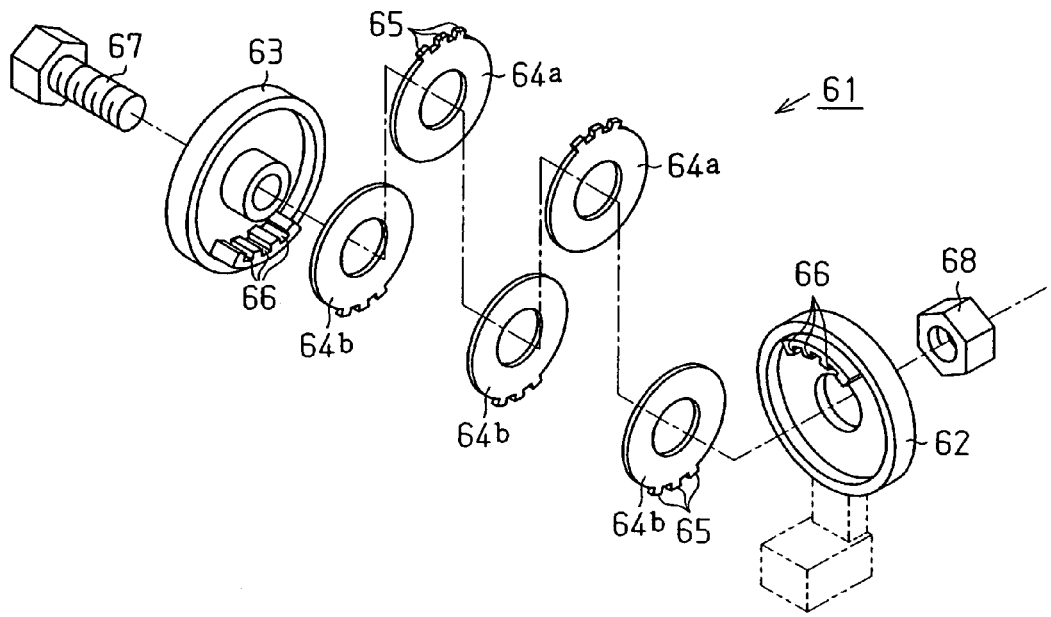
FIG. 9 is an exploded perspective view showing an angle adjustor of the prior art.
Figure 10:
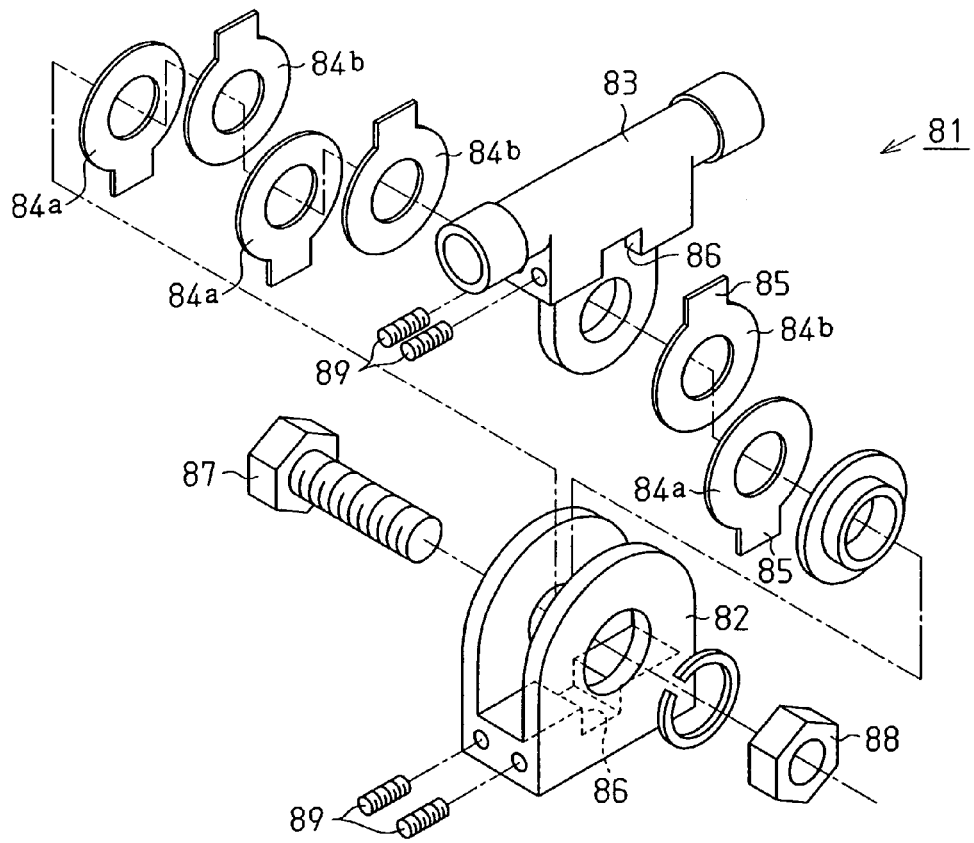
FIG. 10 is an exploded perspective view showing another angle adjustor of the prior art.

An angle adjustor 221 according to a third embodiment of the present invention will now be described with reference to FIG. 8. The second embodiment employs a pressing member 237 for the angle adjustor 221 that differs from the pressing member 137 of the angle adjustor 111 in the second embodiment. The pressing member 237 in the third embodiment does not have a part corresponding to the head 145 of the pressing member 137 in the second embodiment. Further, the pressing member 237 is formed only by a functional piece 246, which corresponds to the functional piece 146 of the pressing member 137 in the second embodiment.

Further, instead of the head 145, a plate-like cover 245 covers the top end opening 32a of the notch 32. The cover 245 is fixed to the top of the pressing member 237. Alternatively, the cover 245 may be fixed to the stepped portions 39. The cover 245 may be fixed to the pressing member 237 or stepped portions 39 by an adhesive, an adhesive tape, or a screw. The cover 245 may also be fitted to the pressing member 237 or stepped portions 39. Although the shape of the cover 245 in the present embodiment is similar to the shape of the head 145 of the pressing member 137 in the second embodiment, the function of the cover 245 is mainly to cover the screw 38 and the tabs 126 of the friction plates 114 to 116. The cover 245 does not directly press the tabs 126 of the friction plates 114 to 116.

The angle adjustor 211 of the third embodiment has the advantages described below in addition to advantages (1) to (5) of the angle adjustor 11 of the first embodiment and advantage (9) of the angle adjustor 111 of the second embodiment.

(10) The pressing member 237 has a simple shape and is compact.

(11) The cover 245 covers the screw 38. This improves the appearance of the angle adjustor 211.

It should be apparent to those skilled in the art that the present invention may be embodied in many other specific forms without departing from the spirit or scope of the invention. Particularly, it should be understood that the present invention may be embodied in the following forms.

The angle adjustor 11 of the first embodiment may have a single projection that projects from the functional piece 46 of the pressing member 37 in lieu of the two ribs 52. In this case, the projection does not necessarily have to be inclined as long as the functional piece 46 gradually increases the force applied to the tabs 26 of the friction plates 14 to 16 as the pressing member 37 enters the notch 32.

The cover 245 of the third embodiment may be eliminated.

The present examples and embodiments are to be considered as illustrative and not restrictive, and the invention is not to be limited to the details given herein, but may be modified within the scope and equivalence of the appended claims.

What is claimed is:

1. An angle adjustor for attachment to a musical instrument support for supporting a musical instrument and adjusting angular position of the musical instrument, the adjustor comprising:
    a fixed member connectable to the support;
    a movable member connectable to the musical instrument and arrangable facing the fixed member in a manner rotatable relative to the fixed member, the movable member being rotatable to enable adjustment of the angular position of the musical instrument;
    a rotation shaft rotatably connecting the movable member to the fixed member;
    at least two friction plates, through which the rotation shaft is inserted, arranged between the fixed member and the movable member;
    two pressing members for restricting rotation of the friction plates relative to the movable member and the fixed member with a first force acting in a direction parallel to an axis of the rotation shaft and for pressing the friction plates against the fixed member and the movable member using a second force applied in a rotation direction of the movable member to prohibit movement the friction plates;
    two fasteners, arranged parallel to the axis of the rotation shaft, for respectively fastening the pressing members to the fixed member and the movable member with the first force, wherein the second force is generated from the first force when the pressing members are fastened to the movable member and the fixed member by the fasteners; and
    a fastening member for fastening the movable member to the fixed member to press the friction plates against one another between the movable member and the fixed member and for adjusting force that fastens the movable member to the fixed member,
    wherein each friction plate includes a disk and a tab, with the tab radially extending from the disk, wherein the fixed member and the movable member each have a notch for receiving the tab and a corresponding one of the pressing members, and each pressing member holds and prohibits movement of the tab of the friction plate in the corresponding notch.

2. The angle adjustor according to claim 1, wherein:
    each of the notches has an opening enabling insertion of the corresponding pressing member, a bottom portion that is narrower than the opening, a first side wall inclined relative to the insertion direction of the corresponding pressing member, and a second side wall extending in a direction parallel to the insertion direction of the corresponding pressing member; and
    each of the pressing members has an inclined first end surface, facing the first side wall of the corresponding notch, and a second end surface, located on a side opposite to the inclined end surface, the inclined first end surface of each pressing member engaging the first side wall of the corresponding notch to produce pressure for holding the tab of each friction plate between the second end surface of the pressing member and the second side wall of the notch.

3. The angle adjustor according to claim 2, wherein each pressing member is spaced apart from the bottom portion of the corresponding notch with the tab of the corresponding friction plate held between the pressing member and the bottom portion, each pressing member includes a head extending perpendicular to the axis of the rotation shaft and a functional piece having the inclined first end surface and the second end surface and projecting from the head parallel to the axis of the rotation shaft.

4. The angle adjustor according to claim 1, wherein each of the pressing members, the tabs of the friction plates, and a bottom portion of the corresponding notch have holes extending along a hypothetical line parallel to the axis of the rotation shaft, a fastener inserted through the holes to fasten each pressing member to the bottom portion of the corresponding notch.

5. The angle adjustor according to claim 1, wherein the fixed member and the movable member each include a first recess, for receiving the friction plates and having a central portion, and a second recess located in the central portion of the first recess and having a depth that is greater than that of the first recess.

6. The angle adjustor according to claim 1, wherein three of the friction plates are attached to the fixed member, and three of the friction plates are attached to the movable member.

7. The angle adjustor according to claim 1, wherein the rotation shaft includes a bolt having a shaft with a polygonal cross-section, with the shaft fitted to the fixed member or the movable member to prohibit rotation of the bolt, the bolt including a distal end projecting from the fixed member or the movable member and a head having a greater diameter than the shaft, and a nut engagable with the distal end, in which the nut and the head of the bolt form the fastening member, and rotation of the nut is permitted while the shaft restricts rotation of the bolt.

8. An angle adjustor for attachment to a musical instrument support for supporting a musical instrument and adjusting angular position of the musical instrument, the adjustor comprising:
- a fixed member connectable to the support;
- a movable member connectable to the musical instrument and arrangable facing the fixed member in a manner rotatable relative to the fixed member, the movable member being rotatable to enable adjustment of the angular position of the musical instrument;
- a bolt rotatably connecting the movable member to the fixed member;
- at least two friction plates, through which the bolt is inserted, arranged between the fixed member and the movable member;
- two pressing members for restricting rotation of the friction plates relative to the movable member and the fixed member with a first force acting in a direction parallel to an axis of the bolt and for pressing the friction plates against the fixed member and the movable member using a second force applied in a rotation direction of the movable member to prohibit movement the friction plates;
- two fasteners, arranged parallel to the axis of the bolt, for respectively fastening the pressing members to the fixed member and the movable member with the first force, wherein the second force is generated from the first force when the pressing members are fastened to the movable member and the fixed member by the fasteners; and
- a nut for fastening the movable member to the fixed member to press the friction plates against one another between the movable member and the fixed member and for adjusting force that fastens the movable member to the fixed member, wherein each friction plate includes a disk and a tab, with the tab radially extending from the disk, wherein the fixed member and the movable member each have a notch for receiving the tab and a corresponding one of the pressing members, and each pressing member holds and prohibits movement of the tab of the friction plate in the corresponding notch.

9. The angle adjustor according to claim 8, wherein:

each of the notches has an opening enabling insertion of the corresponding pressing member, a bottom portion that is narrower than the opening, a first side wall inclined relative to the insertion direction of the corresponding pressing member, and a second side wall extending in a direction parallel to the insertion direction of the corresponding pressing member; and each of the pressing members has an inclined first end surface, facing the first side wall of the corresponding notch, and a second end surface, located on a side opposite to the inclined end surface, the inclined first end surface of each pressing member engaging the first side wall of the corresponding notch to produce pressure for holding the tab of each friction plate between the second end surface of the pressing member and the second side wall of the notch.

* * * * *